United States Patent [19]
DeWitt et al.

[11] Patent Number: 5,657,929
[45] Date of Patent: Aug. 19, 1997

[54] AIR-LIQUID SYSTEM FOR CLEANING VEHICLE HEADLIGHT LENS AND SIMILAR SURFACES

[75] Inventors: Mark W. DeWitt, Lake Oswego; Dennis R. Partlow, Sandy, both of Oreg.

[73] Assignee: Sprague Controls, Inc., Canby, Oreg.

[21] Appl. No.: 583,343

[22] Filed: Jan. 5, 1996

Related U.S. Application Data

[63] Continuation-in-part of Ser. No. 508,455, Jul. 28, 1995, abandoned.

[51] Int. Cl.⁶ ..................................... B05B 1/10
[52] U.S. Cl. ................... 239/284.2; 15/250.002
[58] Field of Search ............. 239/284.2; 15/250.002

[56] References Cited

U.S. PATENT DOCUMENTS

| | | | |
|---|---|---|---|
| 3,114,168 | 12/1963 | Taylor | 15/250.02 |
| 3,448,481 | 6/1969 | Jones, Jr. | 15/250.3 |
| 3,453,049 | 7/1969 | Wager, Jr. | 356/73 |
| 3,456,278 | 7/1969 | Mandy et al. | 15/250.02 |
| 3,496,804 | 2/1970 | Fennell | 313/110 |
| 3,641,613 | 2/1972 | Povilaitis et al. | 15/250.02 |
| 3,893,203 | 7/1975 | Berkelius | 15/250.01 |
| 3,915,385 | 10/1975 | Hassinger | 239/284.2 |
| 4,026,468 | 5/1977 | Tinder et al. | 239/66 |
| 4,026,473 | 5/1977 | Tinder et al. | 239/284.2 X |
| 4,230,276 | 10/1980 | Tinder et al. | 239/284.2 X |
| 4,323,266 | 4/1982 | Savage | 239/284.2 X |
| 4,324,363 | 4/1982 | Rauen, Jr. | 239/284.2 X |
| 4,815,634 | 3/1989 | Nowicki | 222/133 |
| 5,083,339 | 1/1992 | Bristow | 15/250 A |
| 5,546,630 | 8/1996 | Long | 239/284.2 X |

FOREIGN PATENT DOCUMENTS

| | | | |
|---|---|---|---|
| 2605906 | 10/1986 | France . | |
| 2502389 | 7/1976 | Germany | 239/284.2 |
| 3842375 | 7/1989 | Germany . | |

*Primary Examiner*—Lesley D. Morris
*Attorney, Agent, or Firm*—Dellett and Walters

[57] ABSTRACT

Liquid and air outlet nozzle assemblies are capable of mounting on a vehicle adjacent the headlights and are positioned such that liquid and air jets from the nozzles intersect prior to engaging the headlight to form a spray mixture that cleans the headlight. The nozzle assemblies are associated with a control valve capable of connection in a pressurized air system on the vehicle and in the pressurized washer system for the windshield wipers and also capable of automatically directing liquid from the vehicle washer system and pressurized air on the vehicle to the liquid and air nozzles to form a headlight cleaning function upon manual activation of the pressurized windshield washer system of the vehicle. An embodiment of the nozzle assembly has an extension and retraction piston for extending nozzle openings toward the headlight in operation condition of the assembly.

20 Claims, 7 Drawing Sheets

AIR-LIQUID SYSTEM FOR CLEANING VEHICLE HEADLIGHT LENS AND SIMILAR SURFACES

This application is a continuation-in-part of copending application Ser. No. 08/508,455 filed on Jul. 28, 1995 and now abandoned.

BACKGROUND OF THE INVENTION

This invention relates to new and useful improvements in apparatus for cleaning vehicle headlight lens and similar surfaces, using available pressurized air and pressurized cleaning liquid on the vehicle.

The headlights of vehicles, and particularly trucks, often become dirty and in cold conditions also become coated with ice and/or snow. Devices have heretofore been employed that are intended to clean headlights and it is a known use to direct pressured air and liquid against the headlights for this purpose, U.S. Pat. No. 3,469,088. Also, U.S. Pat. No. 4,026,468 relates to a headlight cleaning assembly that cleans vehicle headlights by using first and second nozzles for jetting an air/liquid mixture against the headlight surface. U.S. Pat. No. 5,083,339 shows a lens cleaning apparatus employing a nozzle which cleans the lens in reciprocating movements of the arm.

Most trucks carry air systems that supply pressurized air to functioning parts of the vehicle. This type of vehicle also carries a pressurized washer supply that is directly associated with windshield wipers so that the wipers function with a combination rinse and wiping action. This washer system for the windshield wipers employs an activating switch located in the cab of the vehicle. The switch turns on the reciprocating drive means for the wipers and also turns on a pump that supplies cleaning fluid to the windshield in the area of the wipers.

SUMMARY OF THE INVENTION

It is an object of the invention to provide an improved air liquid system for cleaning headlight lens on vehicles.

It is another object of the invention to provide an air-liquid headlight cleaning system for vehicles of the type that have pressurized air on board and also have a manually activated pressurized windshield washer system in combination with the windshield wipers, the washer system having nozzle outlets capable of being mounted adjacent the headlights and also having valve means that automatically activate the headlight cleaning system upon manual activation of the windshield washer system.

A further object is to provide a novel fluid pressure piloted air relay valve structure in the air-liquid system of the invention that provides said automatic activated operation of the headlight cleaning system.

Yet another object is to provide an air liquid headlight cleaning system for vehicles that has retractible nozzle means which automatically advance from a withdrawn rest position spaced from the headlight to an operative position adjacent the headlight upon activation of the headlight cleaning system.

In carrying out the objects of the invention, the invention is intended for use with vehicles of the type which have pressurized air on board and also an operator activated pressure washer system for the windshield wipers. The invention includes liquid outlet nozzles for the headlights and means associated with the said liquid outlet nozzles that are capable of mounting the liquid outlet nozzles in such a position that jets from the nozzles have a cleaning function for headlights. Also provided are air outlet nozzles and means associated with these nozzles that are capable of mounting the air outlet nozzles in a position to combine with the jets of cleaning liquid from the liquid outlet nozzles to form a spray that impinges forcefully against the headlight lens and provides cleaning for the lens. A valve is provided that is capable of connection in the pressurized air on a vehicle and in the pressurized washer system for the windshield wipers, wherein to automatically direct liquid from the pressure washer system of the vehicle and air from the pressurized air on board the vehicle to the liquid and air outlet nozzles upon manual activation of the pressure washer system of the vehicle. The valve utilizes a novel diaphragm-operated plunger structure for activating the air and liquid operation of the outlet nozzles under the control of the windshield washer system. In one form of nozzle structure, nozzle portions automatically advance from a retracted position to a better position relative to the headlight upon activation of the headlight cleaning system to divert air/fluid mixture toward the headlight.

The invention will be better understood and additional objects and advantages will become apparent from the following description taken in connection with the accompanying drawings

DETAILED DESCRIPTION OF A PREFERRED EMBODIMENT

Figure 1:
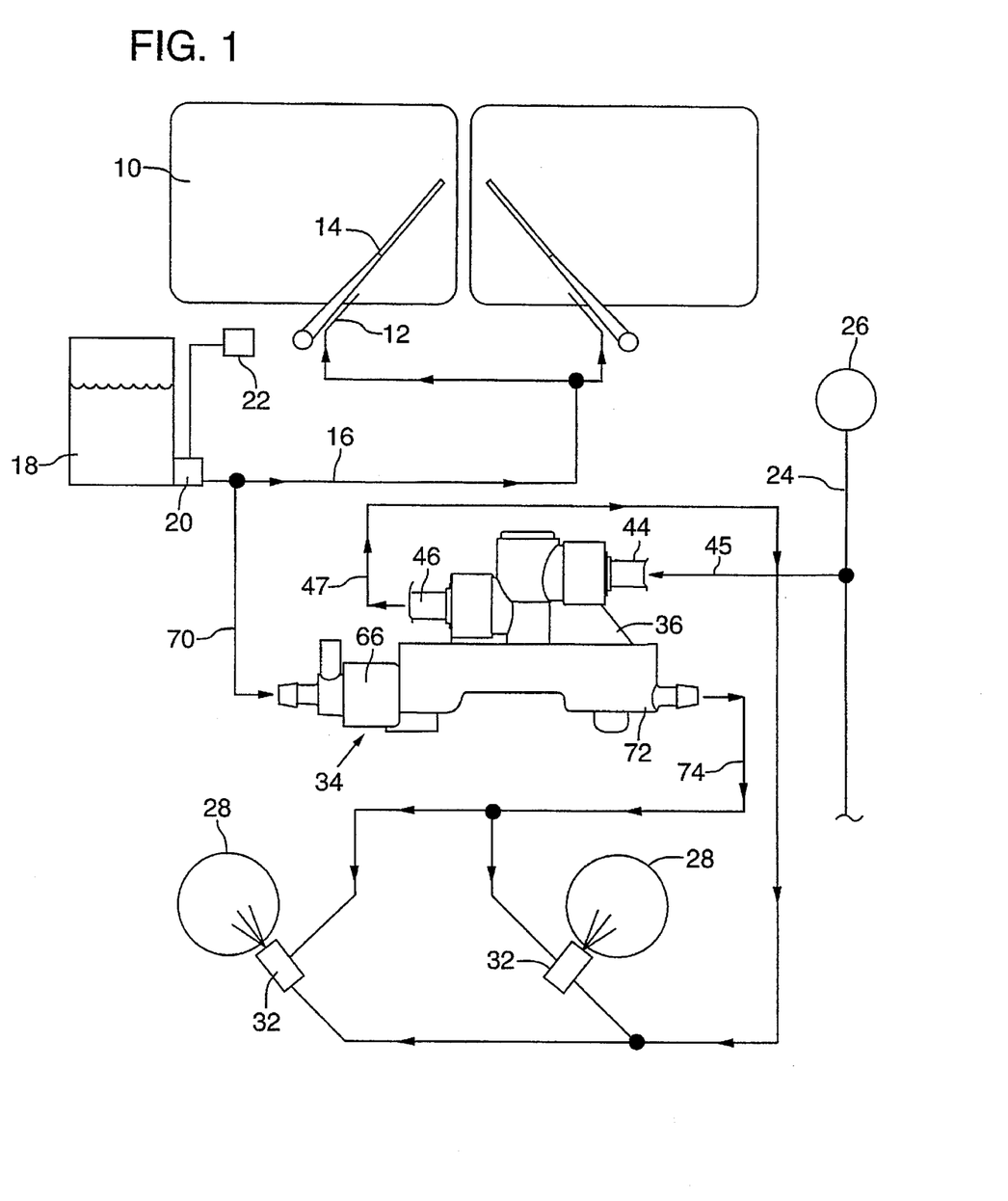
FIG. 1 is a diagrammatic view of an existing windshield wiper washing system and also an existing pressurized air system of a vehicle, and including the present invention combined in such a system.

With particular reference to the drawings and first to FIG. 1, the numeral 10 designates a conventional vehicle windshield and the numeral 12 designates conventional washer jets associated with windshield wipers 14. In most washer systems, the jets 12 have conduit communication 16 with a washer fluid reservoir 18. Washer fluid from the reservoir is forced through the conduits 16 by pump means 20 such as an electric pump. Operation of the windshield washers in most conventional vehicle systems is activated by a switch 22 in the cab that turns on the wipers. The numeral 24 designates an air line Of the vehicle normally used for auxiliary air systems with pressures above and separate from air brake requirements and supplied from an on-board compressor 26. The numeral 28 designates the headlights of the vehicle.

Figure 2:
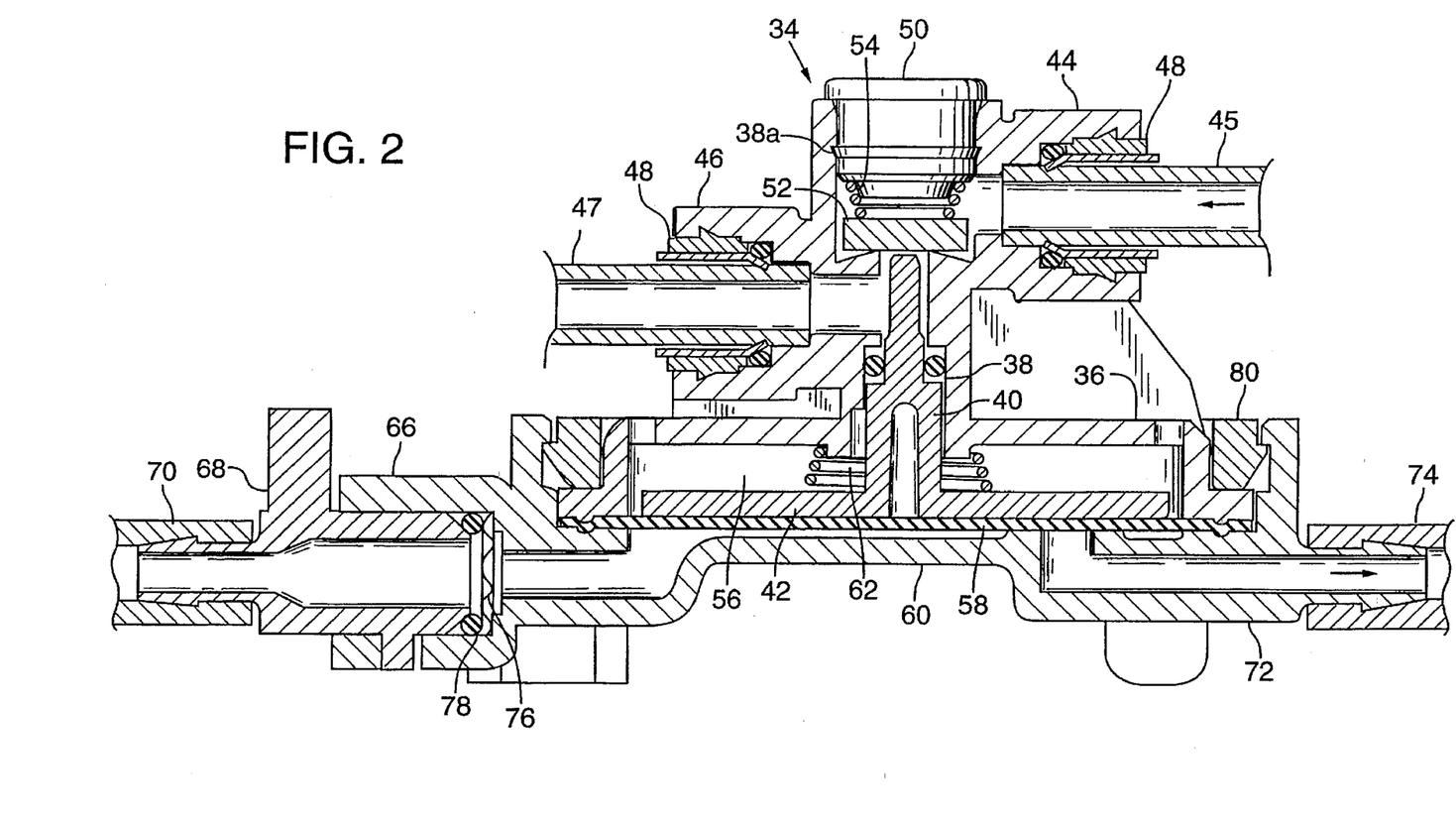
FIG. 2 is a vertical sectional view of a valve structure of the invention capable of combining the windshield wiper washing system and pressurized air system of a vehicle with the present headlight washer nozzles, this view showing the valve in a rest or inoperative condition.
Figure 3:
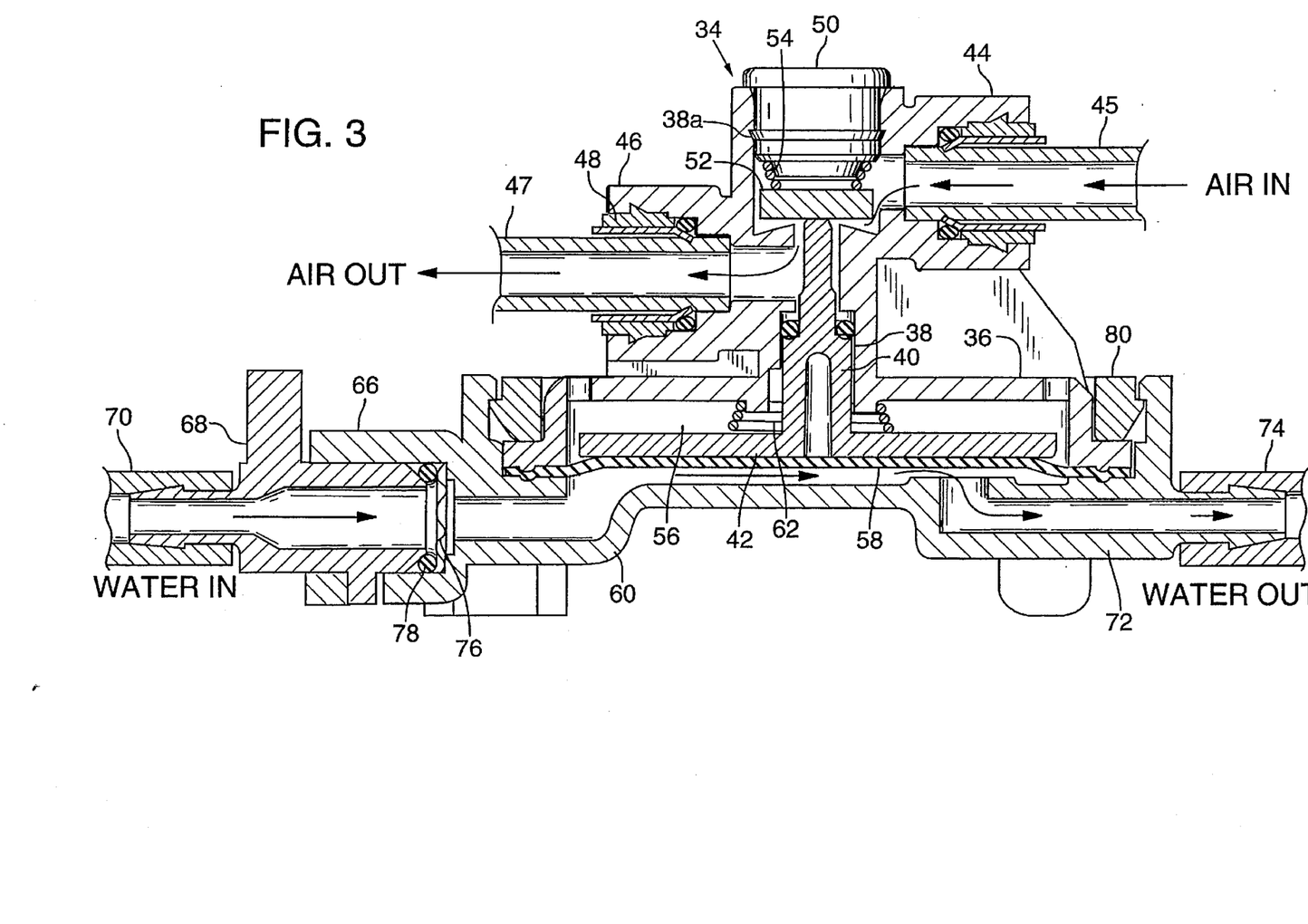
FIG. 3 is a view similar to FIG. 2 but showing the valve in activated position.

According to the invention, headlight washer means 32 are mounted on the vehicle adjacent the headlights 28, and a fluid pressure piloted air relay valve 34, FIGS. 1–3, of novel structure is capable of being tapped into the vehicle pressurized windshield washer system conduit 16 and also into the air pressurized system air line 24 for using a combination of the windshield washer fluid and pressurized air to clean the headlights when the switch 22 is turned on to supply fluid to the windshield washers.

The valve 34 comprises a valve body 36 with a central bore or cylinder 38 having the stem 40 of a diaphragm 42 slidably contained therein. An air inlet port 44 adjacent the opposite end of the stem 40 from the diaphragm leads into the bore 38 from one side thereof and an air outlet port 46 leads away from the bore on the opposite side. Outlet port 46 is axially offset from port 44. Ports 44 and 46 are adapted to receive conventional fittings 48 that connect hoses 45 and 47, respectively into the valve body.

Bore 38 has a counterbore 38a which is closed at the end opposite from the diaphragm by an end cap 50. Bore 38a has a sealing disc 52 disposed freely therein and held in airtight engagement with the inner end of the counterbore 38a by air pressure supplied by air inlet port 44 and by a compression spring 54. Diaphragm 42 operates in a chamber 56 in the valve body and is urged outwardly into abutment with a flexible backing cover 58 and a housing cover 60 by a conical compression spring 62. The stem 40 is of selected length so that the one end thereof is disposed closely adjacent the seal 52 but not engaging the seal during normal or rest position of the diaphragm against the housing cover 60. FIG. 2 shows the position of seal 52 and diaphragm 42 in their rest position. Compression spring 54 is of sufficient strength to hold the seal 52 in sealed engagement against the inner end of counterbore 38a and supplements the higher force of pressured air at inlet 44 but such forces are readily overcome by opposing forces of liquid acting on the large diaphragm, FIG. 3, as will be more apparent hereinafter. Unseating of the seal 52 allows pressurized movement of air through the valve.

The valve housing cover 60 has a cleaning fluid inlet port 66 for a hose fitting 68 and connected inlet washer inlet hose 70 and an outlet port 72 capable of connection to an outlet hose 74. Inlet port 66 includes a filter 76 and a sealing O-ring 78. Valve body 36 and cover 60 are suitably secured together by a permanent lock ring 80. In the rest condition of the valve, diaphragm 42 and backing cover 58 seal off any flow of liquid between the inlet port 66 and outlet port 72, including gravity flow of liquid.

Figure 4:
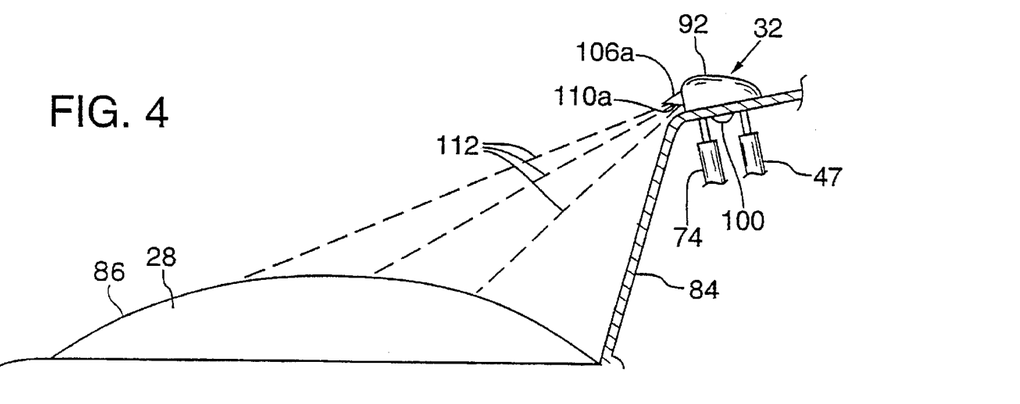
FIG. 4 is a diagrammatic view of a first form of nozzle structure of the invention mounted on a vehicle adjacent a headlight of the vehicle.
Figure 5:
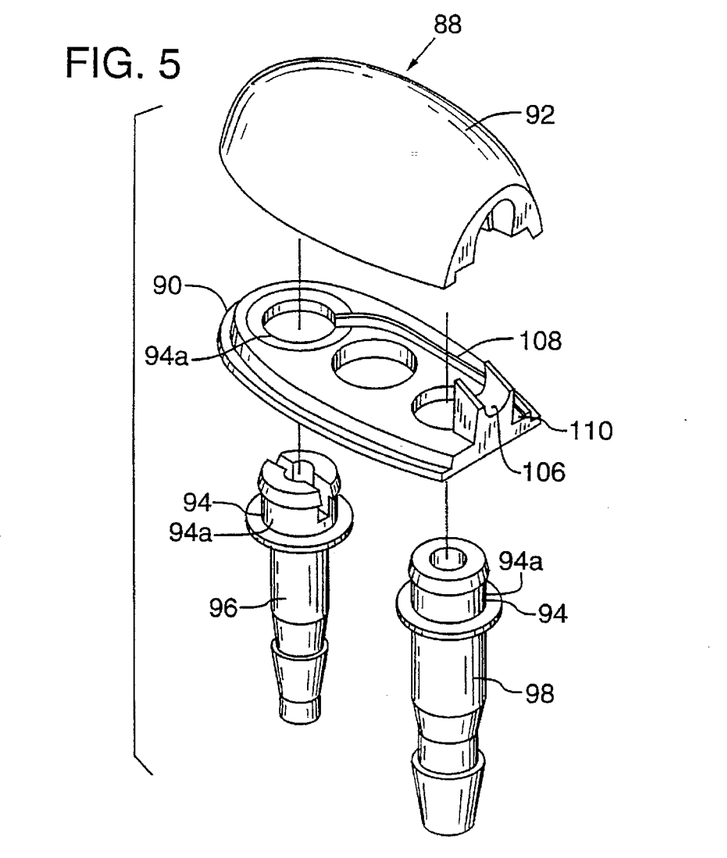
FIG. 5 is an exploded view of the nozzle structure of FIG. 4.
Figure 6:
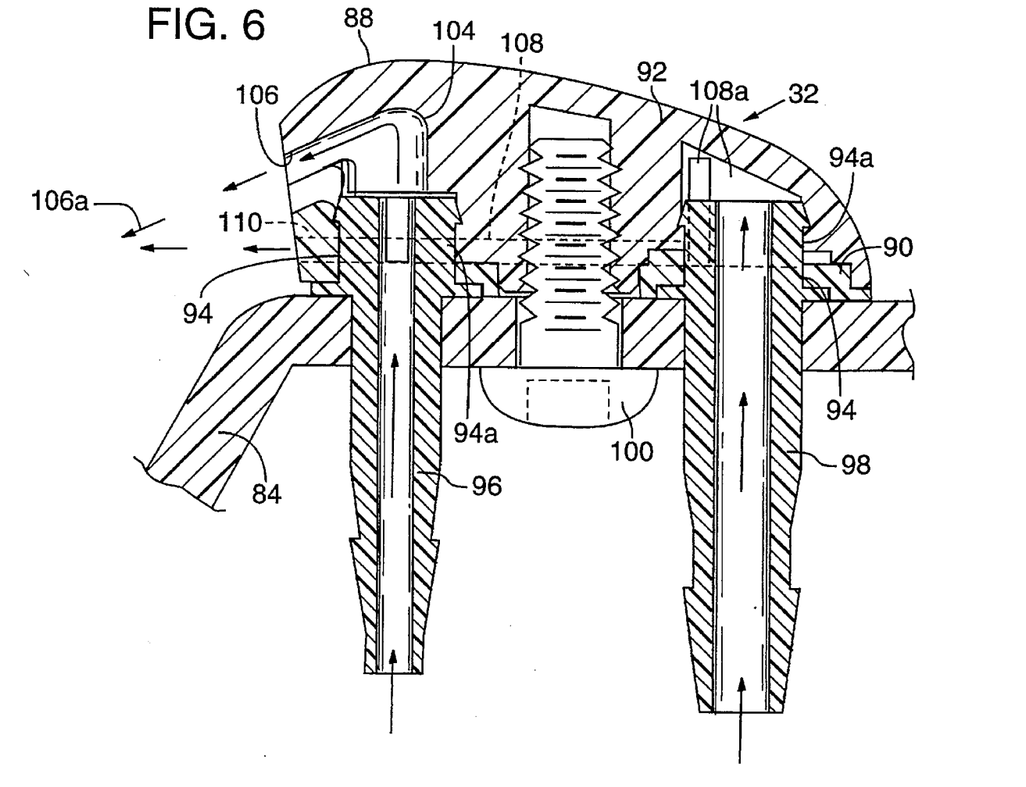
FIG. 6 is a vertical, central, longitudinal sectional view of the nozzle structure of FIG. 4.

With reference to FIGS. 1 and 4, valve 34 is in communication with the headlight washer means 32 by air outlet hose 47 from the valve and by washer liquid outlet hose 74 from the valve. With reference to FIGS. 4 and 6, the washer means is mounted on a portion 84 of the vehicle that is adjacent to the headlight lens 86, or suitable bracketing can be supplied. The washer means 32 comprises a nozzle housing 88, also seen in FIG. 5, having a base plate 90 and a cover 92 therefor. The base plate and cover have sockets 94 and 94a for a washer fluid inlet fitting 96 for hose 74 from valve 34 and for an air fitting 98 for hose 47 from the valve.

Cover 92 is internally contoured to fit in air sealed engagement with the inwardly projecting ends of the fittings 96 and 98 and downwardly against the base plate 90. Fastening means 100 secure the base plate 90 and cover 92 to the vehicle. Housing cover 92 includes a passageway 104 adjacent its front end that leads from the inner end of fitting socket 94a to an angled jet outlet port 106 exiting through the front of the housing.

Housing 92 and base plate 90 also include a longitudinal passageway 108 that opens through the front of the housing in a jet outlet port 110 arranged to direct air straight out in intersecting relation with the cleaning fluid jet stream. Such intersecting relation is shown in FIG. 6 wherein the numerals 106a and 110a designate the jets from the cleaning fluid jet stream and the air stream, respectively. Air passageway 108 in the cover is in communication with the air socket 94a by auxiliary passageways 108a.

Intersection of the cleaning fluid stream 106 by the air stream is a short distance in front of the nozzle housing 88 whereby the pressurized cleaning fluid jet will be broken up into a spray pattern 112 prior to hitting the lens. Positioning of the washer means 32 on the vehicle and the angle of outlet port 106 is preselected such that the spray stream 112 is aimed at the headlight and preferably at a surface close to the washer. The spacing of the washer means 32 from the lens may vary somewhat depending upon the pressure that exists in the air system of the vehicle but an average spacing is from approximately 3–6 inches. The point of intersection of the jets from the nozzle housing is about one inch. The point at which the jets from said liquid and air outlet streams intersect one another suitably is approximately 3 inches from the headlight lens. Forcefully directing the washing air liquid spray mixture onto the headlight blows or otherwise forces dirt or grime therefrom. The spray can be directed in an overall pattern at the headlight or even to a closest point on the headlight relative to the washer means since the spray pattern not only will hold the liquid on the lens but will cause it to spread and migrate in close contact across the lens for efficient cleaning.

As apparent in FIG. 1, the present headlight washer system is tapped into the windshield wiper washer system for its liquid, namely, hose 70 which is associated with liquid inlet port 66 of the valve 34 is connected into line 16 of the existing windshield wiper washer system. The air for the present headlight washer system is received from the pressured air system on the vehicle, namely, hose 45 which is associated with air inlet port 44 of the valve is connected into the line 24 of the pressured system. The present headlight washer system is activated each time that the windshield wiper washer system is turned on as will now become apparent.

In the operation of the present system, pressured air is always available to the valve 34 by air inlet hose 45 connected into port 44 of the valve. In the rest condition of the valve, sealing disc 52 is held firmly against its seat by spring 54 and air pressure from port 44. Air thus is shut off from reaching outlet port 46 of the valve and air outlet hose 47. Liquid in port 66 of the valve has free communication with the windshield wiper washer system 16 and will remain unpressured until such time that the operator turns on the washer system for the wipers, the diaphragm 42 and stem 40 being held retracted by spring 62 in this rest position. When the operator turns on the windshield washer system, the diaphragm is subjected to washer liquid pressure from inlet port 66 and overcomes its spring 62 to move inwardly. The stem 40 of the diaphragm engages sealing disc 52, and the diaphragm also is arranged to overcome the spring 54 and air pressure in port 44, wherein pressured washer liquid flows between inlet and outlet ports 66 and 72, respectively, of the valve for the supply of the liquid to the headlight washer nozzle 32 by hose 74 and for supply of the air to the nozzle 32 through inlet and outlet ports 66 and 72, respectively, counterbore 38a and bore 38.

Figure 7:
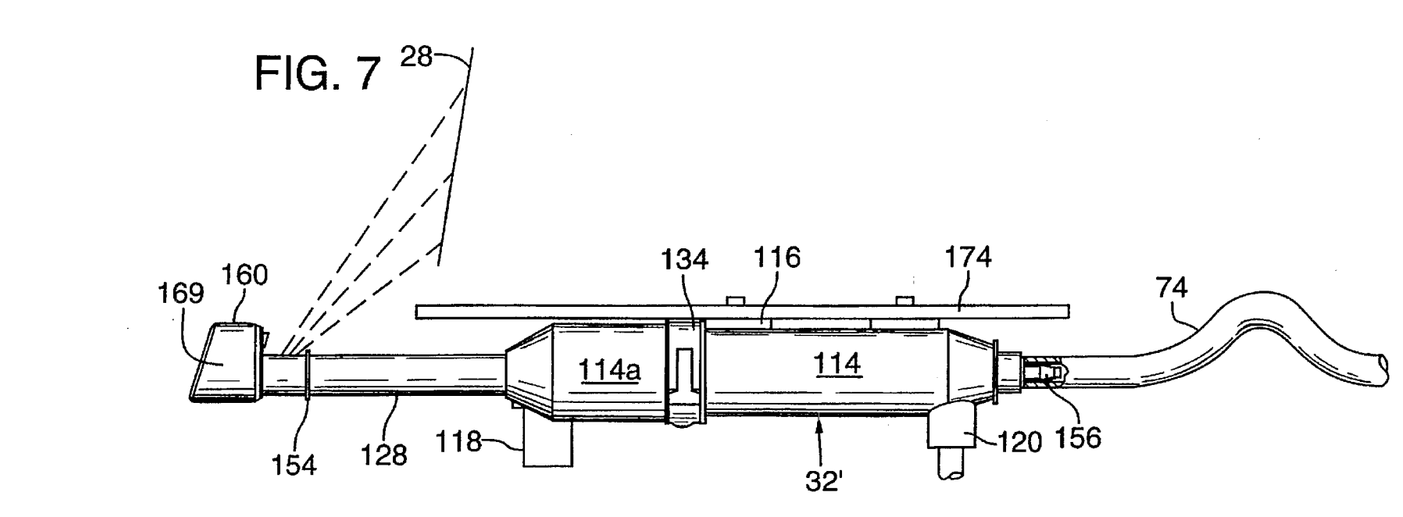
FIG. 7 is a diagrammatic view of a second form of nozzle structure mounted on a vehicle, this view showing an extended washing position of the nozzle.
Figure 8:
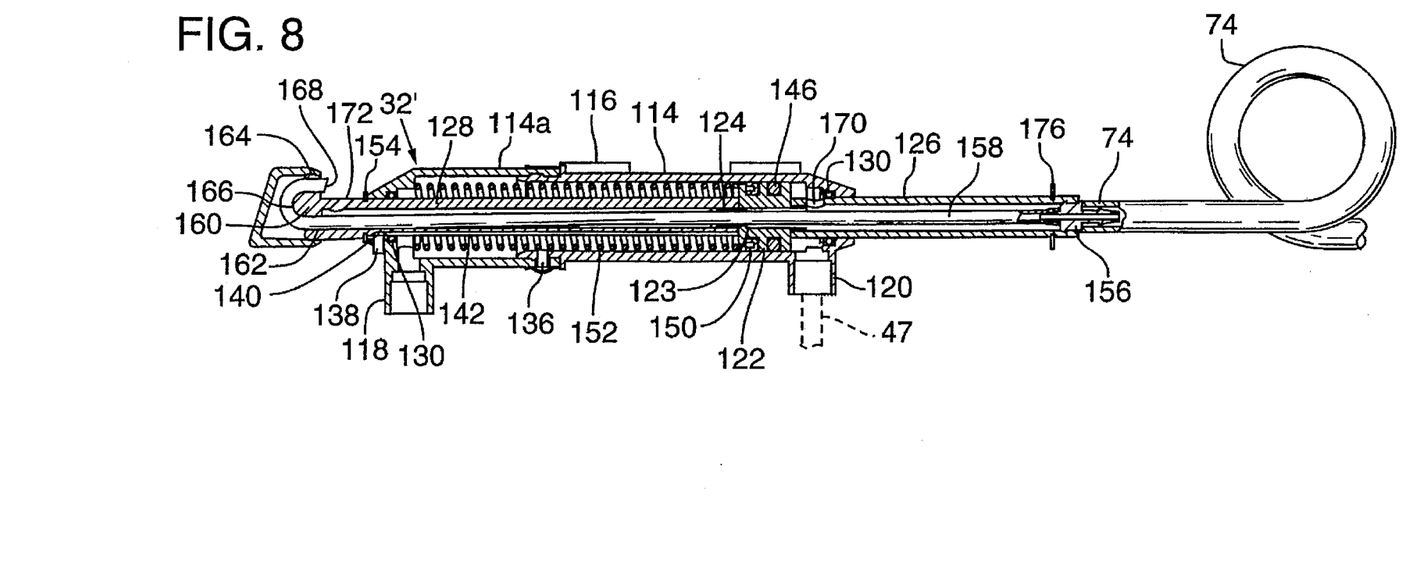
FIG. 8 is a longitudinal sectional view of the nozzle structure of FIG. 7, this view showing a rest or retracted condition of the nozzle.

FIGS. 7 and 8 illustrate a second form of washer means 32'. This form of washer, similar to the first embodiment, is mounted on a vehicle adjacent the headlight, FIG. 7. The embodiment of FIG. 7 has an extending nozzle portion that when activated moves from a retracted position to a spray position. It comprises an elongated cylinder housing 114 and end cap extension 114a. The cylinder and end cap have mounting ears 116 thereon for securement to the vehicle in a manner to be described. A forward end of the cylinder housing 114a has an outlet port 118 comprising an escape outlet for cleaning fluid and debris. A rearward end portion of the cylinder housing 114 has an air inlet port 120 for connection to the hose 47 of the outlet port 46 of the valve. Cylinder housing 114 has a piston head 122 slidable therein having a central bore 123. This piston head has opposite end bosses 124 for securement thereto respectively of a rearwardly extending hollow piston rod 126 that projects through the rearward end of the housing and a forwardly extending hollow piston rod 128 that projects through the forward end of the housing. The, rearward and forward ends of the piston rods have sealing engagement with the ends of the housing by O-rings 130.

Housing portions 114 and 114a are held securely together by a surface clamp 134 and these housing portions are secured in a non-rotatable relative movement by one or more radial pins 136. The piston and piston rod assembly are held against rotation within the housing by a guide pin 138 mounted in a front portion of housing cap 114a and having a head portion 140 that projects into and rides in a longitudinal surface groove 142 in the forward piston rod 128.

Piston 122 includes a sealing O-ring 146 disposed at a rearward portion of its surface and a wiping element 150 disposed in its surface forward of the O-ring. Wiping element 150 protects the O-ring from contaminants that may enter the cylinder from the front. The piston rod assembly has spring return by a compression spring 152. Spring return movement of the piston rod assembly is limited by a stop projection 154 on a forward portion of piston rod 128 engageable with the front of the housing cap 114a.

A hose fitting 156 is secured at the rearward end of the piston rod 126 and attaches hose 74 from the outlet port 72 of the valve 34 with a flexible tube 158 extending through the piston rod assembly and terminating in a front exposed head 160 of the piston rod 128. This head includes a pair of bores 162 and 164. Bore 162 receives the tube from the piston rod 128 and bore 164 receives the terminal end of the tube 158 after the latter has been bent reversely around a rounded front end 166 of the head 160. The front terminal end of tube 158 comprises a jet opening 168 for cleaning fluid admitted from hose 74. Head 160 has a front end cap 169.

Air inlet port 120 communicates with the interior of cylinder housing 114 and this port 120 also communicates with the interior of rear piston rod 126 by means of a port 170 in the wall of this piston rod. Hose 158 passes through the piston head 122 in a clearance fit wherein pressurized air from inlet port 120 has two functions, namely, to drive the piston rod assembly forwardly and also provide air pressure within the piston rod assembly. Forced air from within the piston rod assembly exits through a bore 172 adjacent the front of the piston rod 128.

Bore 172 forms a jet opening for air and is preselected in position to intersect a cleaning fluid jet exiting through port 168. The pressurized jet of air breaks up the cleaning fluid jet and forms a spray that is arranged to impinge against the headlight for cleaning as follows. In operation of the nozzle embodiment of FIGS. 7 and 8, when the valve 34 is activated by the operator turning on the vehicle windshield washers, the hose 74 from the valve supplies pressurized cleaning fluid to tube 158 in the piston rod assembly and cleaning fluid is ejected forcefully from jet opening 168. At the same time, pressurized air from hose 47 leading from air outlet port 46 enters the cylinder housing through inlet 120 behind the piston head 122 and drives the piston rod assembly from its retracted position of FIG. 8 to the extended position of FIG. 7. Air also reaches the jet opening 172 of piston rod 128 by escaping past the clearance fit of tube 158 as it passes through the piston head. The jet of air that intersects the jet of cleaning fluid breaks up the latter into a spray and forcefully drives it at an angle away from the nozzle. Outward movement of the piston rod assembly is controlled by a stop projection 176 adjacent the rearward end of the piston rod assembly and engageable with the adjacent end of the housing. The nozzle will be driven to its return or retracted position by the spring 152 as soon as the pressurized air is shut off.

FIG. 7 illustrates a mounting position of the nozzle. In this mounted arrangement a platform 174 is available or made available to hang the nozzle under it. The mounting is such that when retracted, the nozzle head is behind the outer end of the platform 174 for protection but when extended the nozzle end is positioned to direct the cleaning spray selectively against the headlight 28.

Figure 9:
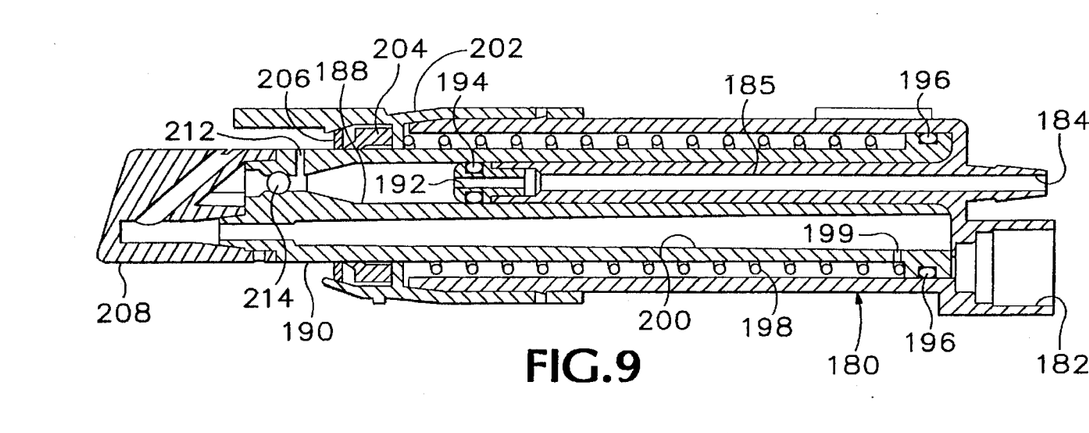
FIG. 9 is a longitudinal sectional view of a third form of nozzle structure showing a retracted position of the nozzle.
Figure 10:
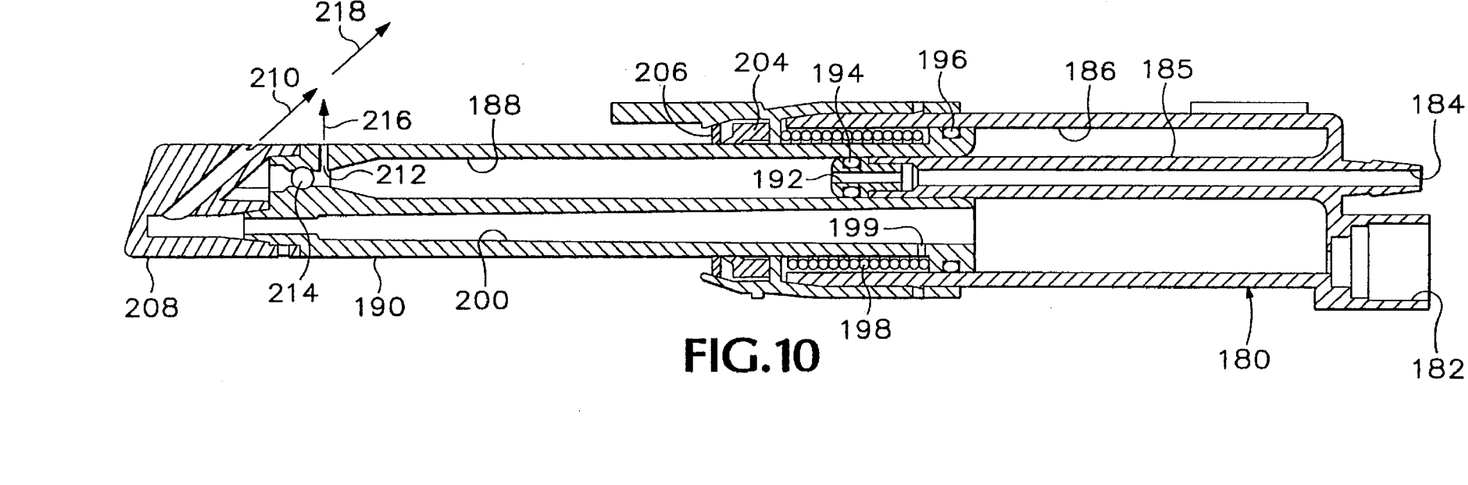
FIG. 10 is a longitudinal sectional view of the nozzle structure of FIG. 9, this view showing an extended washing position of the nozzle.

Referring now to FIGS. 9 and 10, which comprise retracted and extended sectional views of a preferred washer means 32, the washer comprises a housing 180 which receives pressurized air via inlet 182 and fluid via opening 184. The fluid opening 184 extends inwardly of an annular cavity portion 186 as a tube like member 185, slightly off center of the cavity and is slidingly received within a bore 188 of a piston member 190, which suitably fits within and translates inwardly and outwardly of bore 186. Tube 185 terminates in an opening 192 which is in sealing engagement with bore 188 of piston 190 by use of an O-ring 194 near the distal end of tube 185, adjacent the opening 192. Piston 190 is suitably maintained in sealing engagement with bore 186 by O-ring 196. A spring member 198 surrounds piston 190 and is within a cavity which has a leak port 199 defined in the body of piston 190 so as to provide fluid communication between bore 200 of the piston and the annular space defined between the interior of housing 180 and the outer wall of piston 190. Air inlet 182 is also in fluid communication to bore 200. The end of spring 198 closest to the end of housing 180 where connections 182 and 184 are positioned rests against a flange portion of piston 190. The end of spring 198 which is distal from inlet 182 suitably engages against a flange portion of a cap 202 which fits over the open end of housing 180. The cap has a central annular bore therein which receives piston 190 therethrough and allows sliding movement of the piston 190 inwardly and outwardly of the housing 180 as may be observed by comparison of FIGS. 9 and 10. A rod wiper 204 is placed adjacent cap 202 near the opening thereof and is in surrounding engagement with piston 190, suitably removing contamination from the piston as it retracts into the housing. A washer or other securement member 206 maintains the rod wiper in position by preventing forward movement thereof as the piston rod 190 extends. When the piston 190 retracts, the flange portion of cap 202 opposite where spring 198 rests prevents rearward movement of the wiper. The distal end of piston 190 is covered by an end cap 208 which provides an angled fluid communication with chamber 200 and results in communication of air as provided through inlet 182 upwardly at an angle towards a headlight member in the direction of arrow 210 when air pressure is applied. The distal end of bore 188 is tapered to narrow somewhat and communicates with a bore 212 that extends substantially upwardly in perpendicular fashion. A sealing member 214, suitably comprising a chrome ball, blocks the open end of bore 188 beyond the opening 212.

In operation, air pressure is provided through inlet 182 and causes piston 190 to extend as illustrated in FIG. 10. As the piston extends, spring 198 is compressed whereupon when fully compressed, the spring acts as a stop such that engagement of the spring with the flange of cap 202 and the flange of the piston provides the hard stop. As fluid is provided through fluid inlet port 184 and exits through opening 192 of tube 185, it continues through bore 188 of the piston whereupon, since the fluid is blocked from further longitudinal travel by stopper 214, the fluid extends upwardly through bore 212 in the direction of arrow 216. As the air pressure provided by inlet 182 is also operative, the air stream 210 is oriented at an angle and collides with the upwardly extending fluid stream 216 so as to generate a suitably fan-shaped fluid spray 218 upwardly towards the headlight of the vehicle. Once the cleaning operation is completed, the air pressure and fluid pressure are cut off whereupon the spring 198 will cause piston 190 to retract and piston rod wiper 204 will clean off any dirt or the like on the piston rod to prevent entry thereof into the portion of the housing containing the spring. It should be noted that the opening 199 provides fluid communication between the area of the housing containing the spring and bore 200, such that during the extension stroke of the piston, air within the chamber surrounding the spring is not compressed, but instead is allowed to vent into bore 200. Accordingly, resistance against piston extension, as a result of compressing air within the chamber surrounding the spring, is not encountered. Also, contamination is not allowed to enter the spring chamber as would occur if the spring chamber vented to the outside atmosphere. The end cap 208 suitably clips to or is otherwise secured to the end of the piston such that it may be easily replaced or removed if necessary for any reason.

According to the invention a headlight lens cleaning system is provided that is simplified in structure and operation. It can be applied to any vehicle having pressurized air on board and a pressurized windshield wiper washer system. It is activated by turning on the windshield wiper washers. Such system simultaneously activates the windshield wiper blade washers and the headlight lens washers for simplicity of washer fluid means, pressurizing means and electrical circuitry.

It is to be understood that the forms of our invention herein shown and described are to be taken as preferred examples of the same and that various changes in the shape, size and arrangement of parts may be resorted to without departing from the spirit of our invention, or the scope of the subjoined claims.

Having thus described our invention, we claim:

1. An air-liquid headlight cleaning system for vehicles of the type which have pressurized air on board and also a manual activated pressurized washer system for windshield wipers having a reservoir, said cleaning system comprising:

a liquid outlet nozzle, means associated with said liquid outlet nozzle capable of mounting said liquid outlet nozzle on a vehicle in a position such that a jet of cleaning liquid from said liquid outlet nozzle is directed outward in the area of a headlight of the vehicle, an air outlet nozzle, means associated with said air outlet nozzle capable of mounting said air outlet nozzle on a vehicle in a position such that a jet of air from said air outlet nozzle intersects said jet of cleaning liquid and forms a spray mixture that is directed toward a headlight of the vehicle, and a valve capable of connection in the pressurized air on a vehicle and in the pressurized washer system for the windshield wipers, wherein to automatically direct liquid from the pressurized washer system of the vehicle and air from the pressurized air on board the vehicle to said liquid and air outlet nozzles to form a headlight cleaning function upon manual activation of the pressurized washer system of the vehicle.

2. The headlight cleaning system of claim 1 wherein said valve includes plunger means arranged normally to shut off gravity flow of liquid to said liquid outlet nozzle and pressurized air flow to said air outlet nozzle but to allow pressurized liquid flow to said liquid outlet nozzle and air flow to said air outlet nozzle upon being exposed to liquid pressure from the pressurized washer system.

3. The headlight cleaning system of claim 1 including support means capable of mounting said liquid and air outlet nozzles on a vehicle in angular disposition to a headlight lens, said nozzles being angularly disposed relative to each other such that the Jets from the pressurized liquid outlet and pressurized air outlet intersect at a point prior to impinging against the headlight lens for forming said spray.

4. The headlight cleaning system of claim 3 wherein the point at which the Jets from said liquid and air outlets intersect is approximately 3 inches from the headlight lens.

5. The headlight cleaning system of claim 3 wherein one of said liquid outlet nozzle and air outlet nozzle is aimed toward the headlight lens and the other of said nozzles is aimed in angular relation to said one of said nozzles such that the Jets intersect to cause the jet of cleaning liquid to be broken up into a spray that is driven into the headlight lens by the jet of air.

6. The headlight cleaning system of claim 5 including a nozzle housing that supports both of said liquid outlet and air outlet nozzles together in their angular relation.

7. The headlight cleaning system of claim 6 wherein said nozzle housing includes piston operating means that extend said liquid and air outlets outwardly of said housing upon activation of said cleaning system.

8. The headlight cleaning system of claim 1 wherein said valve includes a housing having an internal chamber, a diaphragm in said chamber having a stem slidable in said housing, washer fluid inlet means in said housing capable of communication with the pressurized washer system of the vehicle and washer fluid outlet means communicating with said liquid outlet nozzle, sealing means in said housing associated with said diaphragm for controlling flow between said washer fluid inlet means and said washer fluid outlet means, air inlet means in said housing capable of communication with the pressurized air on the vehicle and air outlet means communicating with said air outlet nozzle, and sealing means in said housing between said air inlet and air outlet means capable of being unseated by said stem upon slidable movement of the latter in said housing as a result of force being applied to said diaphragm from the pressure washer system.

9. The headlight cleaning system according to claim 1 wherein said liquid outlet nozzle and said air outlet nozzle are defined on an extensible member, wherein upon application of air from the pressurized air on board the vehicle system, said extensible member will extend to a cleaning position.

10. The headlight cleaning system according to claim 9 further comprising biasing means for urging said extensible member to a retract ed position upon removal of air from the pressurized air system on board said vehicle system.

11. An air-liquid headlight cleaning system for vehicles of the type which have pressurized air on board and also a manual activated pressurized washer system for windshield wipers, said cleaning system comprising:

a liquid outlet nozzle and an air outlet nozzle, means capable of mounting said nozzles on a vehicle adjacent the headlight lens of the vehicle, means capable of connection of said liquid outlet nozzle in communication with the pressurized washer system of the vehicle and means capable of connection of said air outlet nozzle with the pressurized air of the vehicle, means connectable between said nozzles and the pressurized washer system and pressurized air of the vehicle capable of activating said liquid outlet nozzle and said air outlet nozzle when the pressurized washer system on the vehicle for the windshield wipers is activated.

12. The headlight cleaning system according to claim 11 wherein said liquid outlet nozzle and said air outlet nozzle are defined on an extensible member, wherein upon application of air from the pressurized air on board the vehicle system, said extensible member will extend to a cleaning position.

13. The headlight cleaning system according to claim 12 further comprising biasing means for urging said extensible member to a retracted position upon removal of air from the pressurized air system on board said vehicle system.

14. A vehicle comprising:

a source of pressurized air on said vehicle, a manually activated pressure washer system for windshield wipers, a liquid outlet nozzle, means associated with said liquid outlet nozzle mounting said liquid outlet nozzle on the vehicle in a position such that a jet of cleaning liquid from said liquid outlet nozzle is directed toward a headlight of the vehicle, an air outlet nozzle, and means associated with said air outlet nozzle mounting said air outlet nozzle on the vehicle in a position that is directed angularly in relation to the jet of cleaning liquid from said liquid outlet nozzle to form a spray for cleaning the lens.

15. The vehicle according to claim 14 wherein said liquid outlet nozzle and said air outlet nozzle are defined on an extensible member, wherein upon application of air from the pressurized air source on board the vehicle, said extensible member will extend to a cleaning position.

16. The vehicle according to claim 15 further comprising biasing means for urging said extensible member to a retracted position upon removal of air from the pressurized air source on board said vehicle.

17. An air-liquid headlight cleaning system for vehicles of the type which have pressurized air on board and also a manual activated pressurized washer system for windshield wipers having a reservoir, said cleaning system comprising:

a nozzle housing, means in said housing supporting a liquid outlet nozzle and an air outlet nozzle, means on said nozzle housing capable of mounting said housing on a vehicle in a position adjacent a headlight of the vehicle, a valve capable of connection in the pressurized air of a vehicle and in the pressurized washer system for the windshield wipers wherein to automatically direct liquid from the pressure washer system of the vehicle and air from the pressurized air on board the vehicle to said liquid and air outlet nozzles to form a headlight cleaning function upon manual activation of the pressurized windshield washer system of the vehicle, and drive means in said housing capable of extending said liquid and air outlets outwardly upon activation of said cleaning system.

18. The air-liquid headlight cleaning system of claim 17 wherein said drive means includes a piston operable by the pressurized air on board the vehicle upon activation of the headlight cleaning system.

19. The air-liquid headlight cleaning system of claim 18 wherein said piston has a liquid supply channel and an air supply channel defined therein, said liquid supply channel being in sliding/sealing engagement with a liquid supply tube.

20. The air-liquid headlight cleaning system according to claim 19 further comprising a biasing spring for urging said piston to a retracted position in absence of activation of said cleaning system.

* * * * *